May 23, 1933.  C. W. STONE  1,911,043
ELECTRICAL DISTRIBUTION SYSTEM
Filed April 17, 1931
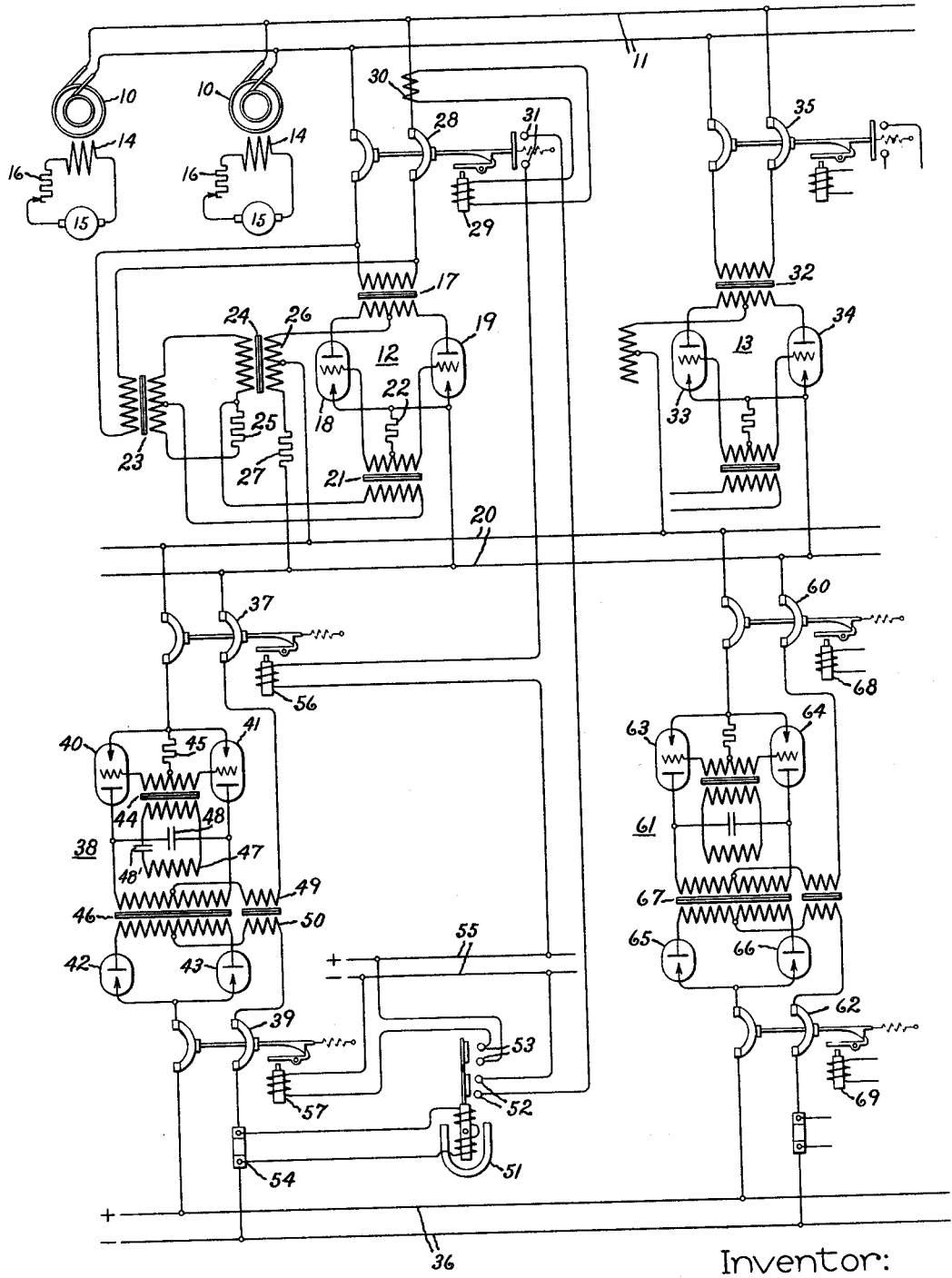
Inventor:
Charles W. Stone,
by Charles E. Gullar.
His Attorney.

Patented May 23, 1933

1,911,043

UNITED STATES PATENT OFFICE

CHARLES W. STONE, OF SCHENECTADY, NEW YORK, ASSIGNOR TO GENERAL ELECTRIC COMPANY, A CORPORATION OF NEW YORK

ELECTRICAL DISTRIBUTION SYSTEM

Application filed April 17, 1931. Serial No. 530,894.

My invention relates to systems of electrical distribution and more particularly to such systems adapted to transmit energy from an alternating current generating station to a direct current distribution network.

In the transmission of energy from an alternating current generating station to a direct current distribution network, it has been proposed heretofore to transform the generated alternating current to a higher voltage, rectify the high voltage alternating current and transmit the high voltage direct current over a feeder circuit, invert the high voltage direct current into alternating current at a substation, transform the alternating current into a lower voltage suitable for the distribution network and rectify the low voltage alternating current. In the conversion of energy between direct and alternating current circuits in such a system the use of electric valves of the vapor electric discharge type has been found particularly advantageous because of the relatively large amounts of power which may be handled at ordinary operating voltages. On the other hand the use of vapor electric valves in a distribution system of this kind attaches serious consequences to the occurrence of a fault in any part of the circuit because of the extremely low internal impedance of the valves. While my invention is of general application, it is particularly suitable for use in connection with systems of distribution of the above described type utilizing vapor electric discharge valves.

It is an object of my invention to provide an improved system of electrical distribution utilizing electric valves for transmitting energy from an alternating current generating system to a direct current distribution network in which the several parts of the circuit will be protected against excessive current due to a fault in any part of the system.

It is another object of my invention to provide an improved system of electrical distribution, including electric valves, adapted to transmit energy from an alternating current generating station to a direct current distribution network through a plurality of feeder circuits, in which a faulty feeder circuit will be isolated in response to a flow of reverse energy from the distribution network into the feeder circuit.

It is a further object of my invention to provide an improved system of electrical distribution, including vapor electric valves, for transmitting energy from an alternating current generating station to a direct current distribution network through a plurality of feeder circuits in which the fault current in any particular feeder circuit is limited to a predetermined value and in which the faulty feeder circuit may be disconnected upon the occurrence of an abnormal load of a predetermined value.

In accordance with one embodiment of my invention the output of an alternating current generating station is converted into high voltage direct current by means of a full wave rectifier comprising a transformer and a pair of vapor electric valves; the high voltage direct current is transmitted over a feeder circuit to a substation in which is located vapor electric valve means for transforming the high voltage direct current into low voltage direct current; and the output of this transforming means is connected to a low voltage direct current network. Circuit breakers are included between the alternating current generators and the rectifier in the generating station, between the feeder circuit and the transforming means in the substation and between the transforming means and the low voltage network also in the substation. A reverse current relay is associated with the circuit breaker between the low voltage network and the transforming means and is provided with a contact which is adapted to operate the circuit breaker to disconnect the transforming means from the low voltage distribution circuit in case of a flow of reverse energy. Other contacts on this relay, in conjunction with auxiliary contacts of the circuit breaker connected between the alternating current generators and the rectifier, serve to control the circuit breaker between the feeder circuit and the transforming means to isolate this substation in case of a fault so that service to any other substations which may be connected to the same generating station will be interrupted only momentarily.

For a better understanding of my invention together with other and further objects thereof, reference is had to the following description taken in connection with the accompanying drawing and its scope will be pointed out in the appended claims. The single figure of the accompanying drawing is a diagrammatic representation of my invention as outlined above.

Referring now to the drawing, I have illustrated apparatus comprising a generating station which includes a pair of alternating current generators 10 connected to a primary alternating current bus 11, a pair of full wave rectifier circuits 12 and 13. Each of the generators 10 is provided with a field winding 14 and an energizing circuit therefor illustrated as an exciter 15 and a field resistor 16. The rectifier 12 comprises a transformer 17 and a pair of electric valves 18 and 19 connected in a well known manner to provide full wave rectification. The direct current circuit of this rectifier is connected to a primary direct current distribution network 20 which is preferably a high voltage circuit. The valves 18 and 19 are each provided with an anode, a cathode and a control grid and may be of any of the several types well known in the art, although I prefer to use valves of the vapor electric discharge type. The control grids of the valves 18 and 19 are connected to the common cathode circuit through opposite halves of the secondary winding of a grid transformer 21 and a current limiting resistor 22. Various grid control circuits known in the art may be employed for controlling the output of the rectifier 12 in accordance with predetermined load conditions. I have shown by way of example the primary winding of grid transformer 21 connected to be energized from an impedance phase shifting circuit comprising a transformer 23, the primary winding of which is energized from the alternating current circuit 11, and a saturable reactor 24 and a resistor 25 connected across the secondary winding of the transformer. The primary winding of the grid transformer 21 is preferably connected between the electrical midpoint of the secondary winding of transformer 23 and the junction between reactor 24 and resistor 25. The reactor 24 is provided with a saturating winding consisting of two portions, the upper portion of which is connected in series with the direct current circuit of the rectifier 12, while the lower portion is connected across the direct current circuit 20 through a current limiting resistor 27. The connections are such that the current flowing in the two portions of this winding produce a differential saturating effect. However, this impedance phase shifting circuit forms no part of my invention, but is disclosed and claimed in a copending application of Myron Zucker, filed April 17, 1931, Serial Number 530,878 and assigned to the same assignee as the present application. Interposed between the alternating current circuit 11 and the transformer 17 is a circuit breaker 28 provided with a trip coil 29, energized from the current transformer 30 in series with the circuit breaker, and with a pair of normally open auxiliary contacts 31. Similarly rectifier 13 comprises a transformer 32 and electric valves 33 and 34 connected between the alternating current circuit 11 and the high voltage direct current circuit 20 through a circuit breaker 35. The connections are exactly similar with those described in connection with rectifier 12 so that the grid control arrangement and the control of the circuit breaker 35 have been omitted for the sake of simplicity.

The high voltage direct current circuit 20 is connected to the low voltage distribution network 36 through a substation including a circuit breaker 37, transforming apparatus 38 for converting the high voltage direct current into low voltage direct current and a circuit breaker 39. The transforming apparatus 38 may be of any of the several types well known in the art and I have illustrated by way of example an apparatus similar to that disclosed and claimed in United States Letters Patent No. 1,800,002 granted April 7, 1931, upon the application of E. F. W. Alexanderson, comprising a transformer 46, a pair of electric valves 40 and 41 associated with the primary winding thereof for inverting the high voltage direct current and a pair of electric valves 42 and 43 associated with the secondary winding for rectifying the low voltage alternating current. The valves 40 to 43 inclusive are preferably of the vapor electric type and the valves 40 and 41 are each provided with a control grid which is connected to the common cathode circuit of these valves through opposite halves of the secondary winding of a grid transformer 44 and a current limiting resistor 45. The primary winding of the grid transformer 44 is energized from some portion of the alternating current circuit of the apparatus, for example, a tertiary winding 47 of the transformer 46. A capacitor 48 is connected between the anodes of the valves 40 and 41 to commutate the current between these valves while a capacitor 48′ is connected in series with the primary winding of grid transformer 44 to determine the frequency of the inverted alternating current. The high voltage and low voltage direct current circuits of the transforming apparatus are coupled through the inductive windings 49 and 50 wound on a common magnetic core. Also included in the substation is a reverse current relay 51, examples of which are well known in the art, provided with two pairs of contacts 52 and 53. The operating winding of this relay is energized in accordance with the current delivered by the transforming apparatus to the distribution network 36, as for example, by energizing it from a shunt included in the connection to the circuit 36. The circuit breaker 37 is provided with an operating electromagnet 56 which is energized from an auxiliary source of direct current 55 through the contacts 52 of the relay 51 and the auxiliary contacts 31 of the circuit breaker 28. The circuit breaker 39 is also provided with an operating electromagnet 57 energized from the circuit 55 through the contacts 53 of the relay 51. The high voltage direct current circuit 20 may also be interconnected with the low voltage distribution network 36 through a second substation comprising a circuit breaker 60, a power transforming apparatus 61 and a circuit breaker 62. The power transforming apparatus 61 comprises electric valves 63, 64, 65 and 66 and a transformer 67, the connections of the substation being in all respects similar to that described above in connection with the other substation. The circuit breaker 60 may be provided with an operating electromagnet 68 which may be energized in parallel with the electromagnet 56 of the circuit breaker 37 from the auxiliary contacts 31 of the circuit breaker 28 in case only a single rectifying apparatus 12 is provided; otherwise through the auxiliary contacts of the circuit breaker 35 and the contacts of a reverse current relay associated with the circuit breaker 62. Similarly the operating electromagnet of the circuit breaker 62 is energized through the contacts of a reverse current relay associated therewith, omitted for the sake of simplicity.

While I have shown the high voltage direct current circuit 20 as being energized from both of the rectifier arrangements 12 and 13, it will be obvious to those skilled in the art that the high voltage direct current circuits of these two rectifiers may be isolated if so desired and that the rectifier 13 may be energized from a separate generating station or that the rectifier 13 may be entirely omitted in certain cases, all without departing from my invention. Similarly it will be understood that, while I have shown only two substations for transmitting energy to the direct current distribution network 36, any desired number may be employed without departing from my invention.

The general principles of operation of the converting and transforming apparatus included in the above described system of distribution will be well understood by those skilled in the art but it may be briefly summarized as follows: The alternating current delivered to the circuit 11 by the generator 10 is transformed to a higher voltage by the transformer 17, rectified by the rectifier 12 and delivered to the high voltage direct current circuit 20. The current output of the rectifier 12 is limited to a predetermined maximum by means of the above described phase shifting circuit. Thus for very light loads the saturating effect of the lower portion of the saturating winding 26 predominates, reducing the reactance of the reactor 24 to a small value and maintaining the grid potentials of the valves 18 and 19 very nearly in phase with the anode potentials of these valves. Upon the occurrence of an overload, however, the current flowing through the upper portion of the saturating winding 26 tends to neutralize the constant current in the lower portion of this winding and to de-saturate the reactor 24, thus increasing its reactance and retarding the phase of the grid potentials of the valves 18 and 19 to reduce the average output of the rectifier, as will be well understood by those skilled in the art. Current is transmitted from the high voltage direct current circuit 20 to the low voltage direct distribution network 36 through the substation comprising circuit breaker 37, the power transforming apparatus 38 and the circuit breaker 39. A detailed explanation of the operation of this power transforming apparatus may be found in the above mentioned Patent No. 1,800,002. Briefly stated, the direct current is inverted into alternating current by means of the electric valves 40 and 41 and their associated grid circuits, secondary winding of the transformer 46, and the commutating capacitor 48. This alternating current is transformed to a lower voltage by means of the transformer 46 and rectified through the valves 42 and 43. The coupling of the two direct current circuits of this apparatus through the inductive windings 49 and 50 serves to reduce the size of the smoothing reactor ordinarily required in such apparatus and to reduce the ripple in the direct current output of the apparatus. Obviously the operation of the rectifying apparatus 13 and the power transforming apparatus 61 will be similar to that described above.

The operation of the system as a whole under various possible fault conditions will now be considered. Assume for example, that a fault occurs in the transformer 17 or in the connections to it. A reverse current from the high voltage direct current circuit 20 or the low voltage distribution circuit 36, either or both of which may be energized from a separate generating station, cannot feed into this short circuit because of the unilateral conductivity characteristics of the valve 18 and 19 of the rectifier 12. The only energy that can flow into this fault therefore must pass through the circuit breaker 28 which is protected by the overload tripping mechanism comprising the solenoid 29 and the current transformer 30. This fault will therefore, be immediately cleared by the circuit breaker. In case one of the rectifier valves 18 or 19 should fail, the above described grid control arrangement will, nevertheless, limit the current output of the rectifier to a safe value. The amount of energy that may be fed into this fault from the rectifier 13 also will be limited to a safe value by the above described grid control arrangement. On the other hand, if the rectifier 12 and the rectifier 13 are not interconnected through the circuit 20 there will, of course, be no transfer of energy between them. As before, the flow of direct current energy from the distribution network 36 is prevented by the unilateral conductivity characteristics of the valves included in the transforming apparatus 38. As in the first assumed case, the fault in the rectifier valves 18 or 19 will cause an overload in the connection from the primary circuit 11 to open the circuit breaker 28.

Upon the occurrence of a fault in the feeder circuit interconnecting the rectifier 12 and the transforming apparatus 38, the amount of energy fed into this fault will be limited to a safe value by means of the grid control apparatus described above. At the same time the flow of reverse energy from the direct current circuit 36 through either the transforming apparatus 38 or 61 will be prevented due to the unilateral conductivity characteristics of the valves in these apparatus and, as before, the fault current will be interrupted by the circuit breaker 28, or, if rectifiers 12 and 13 are interconnected, by both of the circuit breakers 28 and 35. In case of a failure of the inverting valves 40 or 41 of the apparatus 38 or the corresponding valves of the apparatus 61, the same protection will be secured as in the last described condition. However, in this case, after the fault current has been interrupted, the circuit breaker 37 may be opened and service continued through the power transforming apparatus 61 or any other duplicate apparatus provided to interconnect the supply system 11 with the direct current network 36. Lastly an occurrence of a fault in the rectifier valves 42 or 43 of the apparatus 38 or the corresponding valves of the apparatus 61 will cause a reverse current to flow from the direct current load circuit 36 into this fault. Upon the occurrence of such a reverse current, however, the reverse current relay 51 will operate to close its contacts 52 and 53, thus immediately opening the circuit breaker 39 and preventing a further flow of reverse current. At the same time the current flowing into this fault from the primary supply circuit 11 will be limited by the grid control arrangement associated with the rectifiers 12 and 13. However, this maximum value of the fault current is enough to trip the overload circuit breaker 28, which then closes its auxiliary contacts 31. The closing of these contacts completes the connection to the trip coil of the circuit breaker 37, which opens and isolates the faulty transforming apparatus 38. When circuit breaker 37 has opened, circuit breaker 28 may again be reclosed to continue service to the direct current network 36. It will be noted that, by interlocking the operating electromagnet 56 of the circuit breaker 37 with the contacts 31 of the circuit breaker 28, the circuit breaker 37 is prevented from opening until after the fault current has been interrupted, thus serving merely as a mechanical disconnect. Such an arrangement has been found preferable because of the difficulty of opening fault current at the high voltage under which the circuit 20 normally operates.

While I have described what I at present consider the preferred embodiment of my invention, it will be obvious to those skilled in the art that various changes may be made without departing from my invention and I, therefore, aim in the appended claims to cover all such changes and modifications as fall within the true spirit and scope of my invention.

What I claim as new and desire to secure by Letters Patent of the United States is:

1. In a system of distribution, an alternating current generating station including a source of current and electric valve means for rectifying the output of said station, disconnecting means interposed between said source and said valve means, means responsive to a predetermined current for operating said disconnecting means, a direct current feeder circuit, a second disconnecting means, a substation connected to said circuit through said second disconnecting means, and including electric valve means for transforming said direct current to a lower voltage, a third disconnecting means, a distribution circuit connected to said transforming means through said third disconnecting means, means responsive to a reverse flow of energy through said third disconnecting means for operating the same, and means controlled jointly by said reverse energy responsive means and said first disconnecting means for operating said second disconnecting means to isolate said transforming means.

2. In a system of distribution, an alternating current generating station including a source of current and electric valve means for rectifying the output of said station, disconnecting means, provided with auxiliary contacts, interposed between said source and said valve means, means responsive to a predetermined load current for operating said disconnecting means, a direct current feeder circuit, a second disconnecting means, a substation connected to said circuit through said second disconnecting means and including electric valve means for transforming said direct current to a lower voltage, a third disconnecting means, a distribution circuit connected to said transforming means through said third disconnecting means, a reverse energy relay included in the connections to said distribution circuit, contacts actuated by said relay, an operating member for said second disconnecting means and an energizing circuit therefor including the auxiliary contacts of said first disconnecting means and certain contacts of said relay, and an operating member for said third disconnecting means and an energizing circuit therefor including certain contacts of said relay.

In witness whereof I have hereunto set my hand.

CHARLES W. STONE.